May 2, 1950
S. R. NILSSON
2,506,381
CONVEYING VEHICLE SUCH AS PALLET TRUCKS
Filed Jan. 14, 1949
2 Sheets-Sheet 1
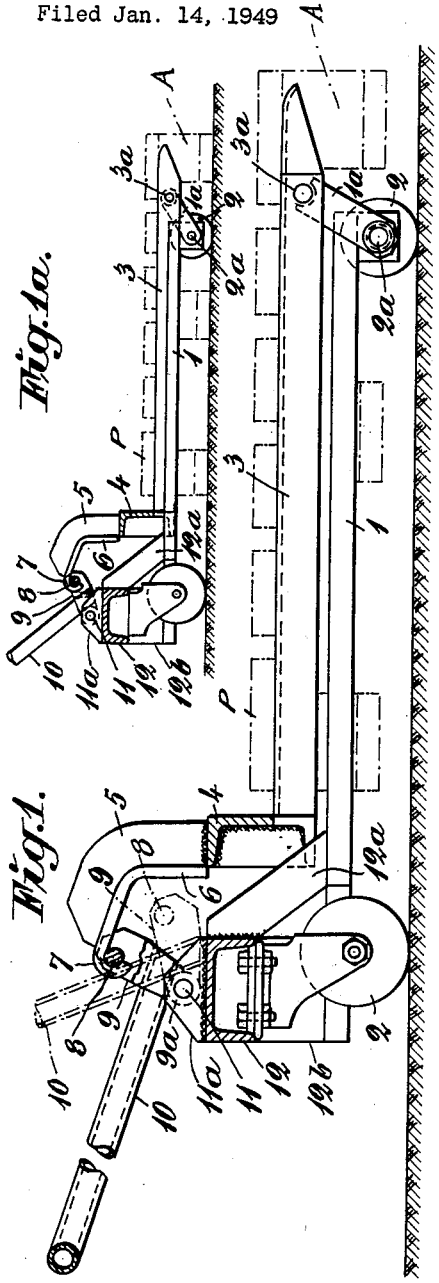
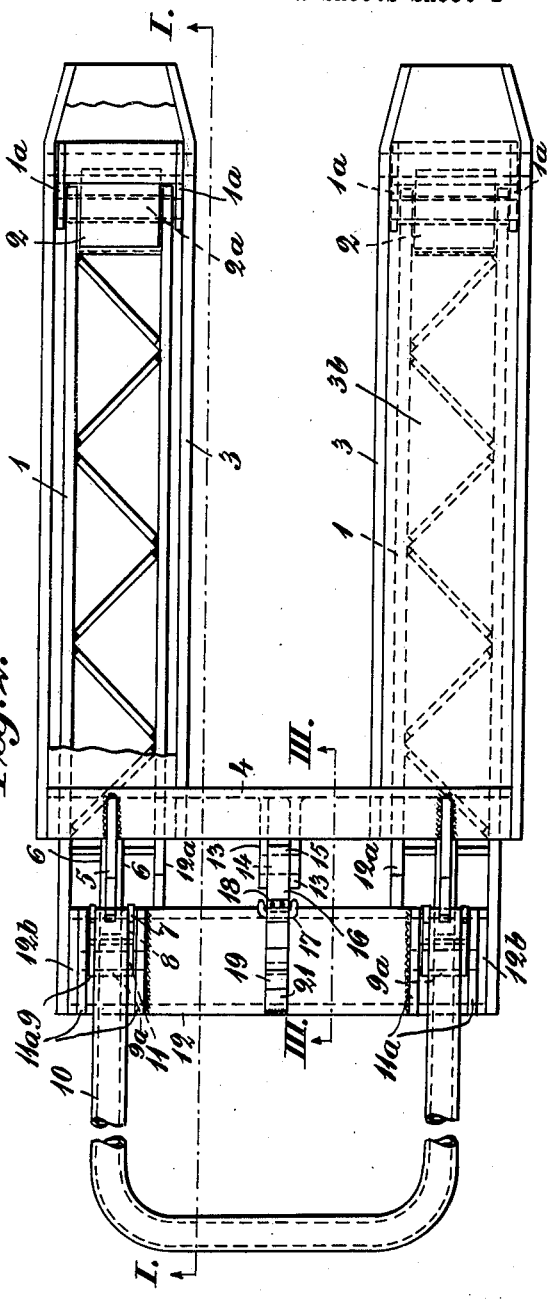
INVENTOR
Sven Rune Nilsson
BY
AGENT May 2, 1950 S. R. NILSSON 2,506,381
CONVEYING VEHICLE SUCH AS PALLET TRUCKS
Filed Jan. 14, 1949 2 Sheets-Sheet 2

INVENTOR
Sven Rikard Nilsson
BY
AGENT

Patented May 2, 1950

2,506,381

UNITED STATES PATENT OFFICE 2,506,381

CONVEYING VEHICLE SUCH AS PALLET TRUCKS

Sven Rune Nilsson, Stockholm, Sweden, assignor to Aktiebolaget Bygg- och Transportekonomi, Stockholm, Sweden, a joint-stock company of Sweden Application January 14, 1949, Serial No. 70,833
In Sweden February 16, 1948

1 Claim. (Cl. 254—2)

This invention relates to conveying vehicles such as pallet trucks or fork trucks which are used for lifting so-called pallets from the ground and for transporting them to a desired place. Such trucks mainly consist of a carriage with wheels and a platform body or a fork adapted to be raised and lowered relative to the carriage so as to enable the fork of the truck to be introduced into corresponding apertures of the pallet, whereupon the pallet is lifted by the fork and the whole carriage together with the pallet conveyed as desired.

The main object of the present invention is to provide a catching mechanism for locking or securing the platform body or fork in the raised position so as to prevent the platform or fork from dropping from this position unintentionally.

A further object of the invention is to prevent the catching mechanism from returning to the locking position unintentionally after having been released.

Further objects and features of the invention will be clear from the following description of one embodiment of the invention with reference to the accompanying drawings, in which—

Figure 3:
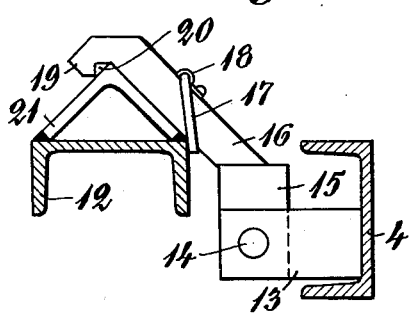

Figure 1 shows a partly sectioned elevation on the line I—I in Figure 2 of a fork truck according to the invention, the platform body or the fork being shown in raised and locked position, Figure 1a is a similar view on a smaller scale showing the platform body or fork in a lowered position, Figure 2 is a plan view of the truck with some parts broken away, Figure 3 is a diagrammatical cross section on line III—III in Figure 2 on a larger scale, showing the locking or catching mechanism in locked position.

Figure 4:
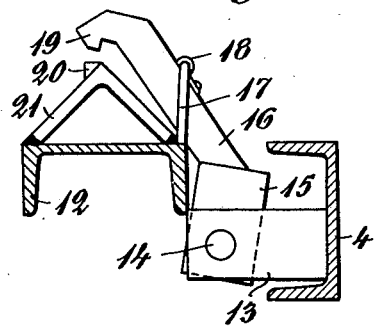
Figure 5:
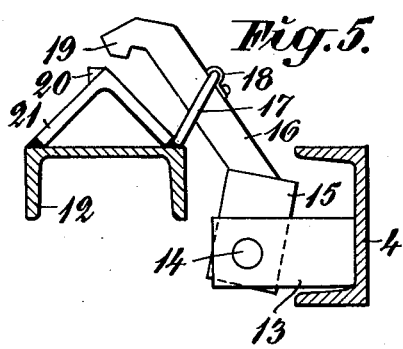
Figure 6:
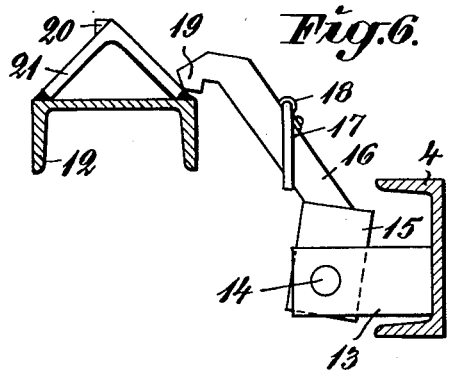

Figure 4 is a section similar to Figure 3, showing the locking or catching mechanism in released position, Figure 5 is a similar section of the locking or catching mechanism illustrating the position of the parts upon beginning rearward motion of the platform or fork, and Figure 6 is a similar section showing the parts of the locking or catching mechanism in the lowered position of the platform or fork.

Referring now to the drawings the truck mainly comprises a forklike frame or undercarriage 1, 1 with rear and front wheels 2, 2 and two beams 3, 3, the rear ends of which are supported by the shaft 2a of the rear wheels by means of links 1a, which are linked to said shaft 2a and to a shaft 3a attached to the beams 3. In Figure 2 one of the beams 2 (the upper one) is shown with part of a covering metal sheet being broken away while the lower beam in Figure 2 is shown with such metal sheet 3b or the like. The beams constitute the platform body of the truck and may be made in any suitable form but in the embodiment shown the two beams 3, 3 form together a fork adapted to lift and carry a so-called pallet indicated by dot and dash lines P in Figure 1. At the front ends the beams 3 are united by means of a transverse beam 4 which at its end portions carries vertical posts or standards 5, 5 which may be welded or otherwise secured to the beam 4. Each standard 5, 5 is bent forwardly as shown in Figure 1 and has a flange 6 which at its free front end is formed as a hitch, hook 7 or the like.

The undercarriage also carries a cross beam 12 supported by brackets 12a, 12b which are secured to the undercarriage 1. The front wheel or wheels 2 may be steerable by being mounted on a bridge adapted to turn around a vertical pivot.

At the top of the beam 12 there are provided two pairs of vertical bearing brackets 11a, each pair carrying a horizontal shaft 11. Journalled on each shaft 11 is a collar 9a associated with a pair of plates 9 provided at the ends of a U-shaped handle 10, so that said handle may be swung in vertical direction around the shafts 11. A transverse bolt 8 is provided between each pair of plates 9 at the top ends of said plates and this bolt is adapted to engage the hook 7 of the flange 6 when the handle 10 is swung into the position shown in full lines in Figure 1, while the bolt 8 is released from this engagement upon swinging the handle 10 upwards into the position shown in lines of dots and dashes in Figure 1. The handle 10 also serves as operating handle on pushing or pulling the truck.

The fork or platform-unit 3, 3a being supported on the links 1a it may be lowered by being pushed backwards which is permitted on raising the handle 10 and thus lowering the bolt 8 to the position shown diagrammatically in Figure 1a. In this position the rear ends of the fork 3, 3a may be introduced in the usual apertures A of a pallet P resting on the ground. The handle 10 is now lowered, the bolt 8 engaging the hook 7 and causing the fork 3, 3a to move forwardly by swinging on the links 1a. At the same time the fork is also lifted due to the swinging motion of the links and this lifting motion causes the pallet P to be lifted from the ground so that the pallet now rests on the fork as shown in Figure 1. The whole truck together with the pallet and its load may now be conveyed to a desired place at which the fork and pallet are lowered again as shown in Figure 1a so as to unload the pallet on the ground.

In order to block up or secure the fork unit 3, 3a in the lifted position (shown in full lines in Figure 1) there is provided a particular catch or locking mechanism, for instance arranged at the middle portion of the beam 4 (see Figure 2). According to the embodiment shown (see also Figure 3) the catch mechanism comprises a pair of brackets 13 fixed to the beam 4 and carrying a horizontal pivot or bolt 14 extending between said brackets. Journalled on the pivot 14 is an angular lever or arm 15, 16 from which a link or U-bolt 17 is suspended swingably in a suitable fitting 18 or the like. The free end of the arm 16 is shaped like a hook 19 which in the raised position of the fork or platform 3, 3a engages a shoulder 20 on an angle iron 21 secured to the beam 12 (see Figure 3). It will be clear, therefore, that in this position the beam 4, and thus also the fork 3, 3 is locked to the beam 12 of the under-carriage.

When it is desired to lower the fork 3, 3a the catch or blocking mechanism is first released by moving the locking arm 16 upwardly to the position shown in Figure 4 until the lower end of the link 17 will engage and be supported by the beam 12 and thus prevent the arm 16 from dropping into the locking or catched position. Now the handle 10 is free to be swung upwardly so as to cause the fork 3, 3a and thus also the beam 4 first to be displaced backwards so that the arm 16 as shown in Figure 5 also will be conveyed backwards correspondingly, the link 17 during this operation serving as an excenter which still prevents the locking arm 16 from returning to its locking position against the shoulder 20. Finally, upon continued swinging movement upwards of the handle 10 the whole fork-like platform 3, 3a is lowered to the position of Fig. 1a and the locking arm 16 will drop to its lower position engaging the angular iron 21 without being prevented by the link 17, as shown in Figure 6.

It will be understood that by no means the link 17 will prevent the catching or locking operation of the arm 16 when the fork 3, 3a is raised again by means of the handle 10 for on completion of this movement the locking arm 16 will drop automatically into the locking position according to Figure 3 and the fork 3, 3a will then be blocked in this position effectively; at the same time the handle 10 will be blocked against unintentional swinging movement upwardly as long as the arm 16 is in its locking position. Consequently, the whole pallet truck may be pushed or pulled in different directions without any risk of the fork 3, 3a being lowered unintentionally.

I claim:

In a conveying vehicle of the kind described comprising an undercarriage with wheels, a platform body and means for raising and lowering the platform body relative to the undercarriage, the combination of a locking shoulder fixed in relation to the undercarriage, a locking arm swingably journalled on a part associated with the platform body and having at its free end a catch member for engaging said locking shoulder so as to lock the platform body in its raised position, a link swingably suspended from the locking arm, a stop member located above and adjacent the lower end of said link in said locked position of the locking arm and arranged to support the link and thus to hold said arm in a released position upon lifting the arm free from its locking shoulder.

SVEN RUNE NILSSON.

REFERENCES CITED

The following references are of record in the file of this patent:

UNITED STATES PATENTS

| Number | Name | Date |
| --- | --- | --- |
| 1,230,250 | Whalley | June 19, 1917 |
| 2,121,764 | Quayle | June 21, 1938 |